United States Patent [19]

Richardson

[11] Patent Number: 4,482,016

[45] Date of Patent: Nov. 13, 1984

[54] ACIDIZING WITH CHEMICALLY HEATED WEAK ACID

[75] Inventor: Edwin A. Richardson, Houston, Tex.

[73] Assignee: Shell Oil Company, Houston, Tex.

[21] Appl. No.: 552,938

[22] Filed: Nov. 17, 1983

[51] Int. Cl.$^3$ .................... E21B 43/27; E21B 43/22
[52] U.S. Cl. .................................. 166/300; 166/307; 166/309
[58] Field of Search ............ 166/250, 300, 302, 303, 166/307, 309, 272

[56] References Cited

U.S. PATENT DOCUMENTS

| | | | |
|---|---|---|---|
| 3,142,335 | 7/1964 | Dill et al. | 166/307 |
| 3,163,745 | 12/1964 | Boston | 166/272 X |
| 3,367,417 | 2/1968 | McCabe | 166/307 |
| 3,817,328 | 6/1974 | Neuman | 166/250 X |
| 3,885,630 | 5/1975 | Richardson | 166/307 |
| 3,915,233 | 10/1975 | Slusser | 166/307 |
| 4,178,993 | 12/1979 | Richardson et al. | 166/300 |
| 4,219,083 | 8/1980 | Richardson et al. | 166/300 |
| 4,330,037 | 5/1982 | Richardson et al. | 166/302 X |

*Primary Examiner*—Stephen J. Novosad
*Assistant Examiner*—Bruce M. Kisliuk

[57] ABSTRACT

Materials in and around a well are acidized with chemically heated, hot acid by injecting a solution of both nitrogen and heat generating reactants and a mixture of weak acid and weak acid salt that both buffers the relation and provides a weak acid acidizing solution.

7 Claims, No Drawings

ACIDIZING WITH CHEMICALLY HEATED WEAK ACID

BACKGROUND OF THE INVENTION

The invention relates to treating wells by acidizing materials in and around their boreholes with a hot, weak acid. More particularly, the present invention relates to conducting such treatments with such an acid that is chemically heated at or near the zone being treated.

Numerous uses of self-reacting aqueous solutions of compounds containing nitrogen generating reactants have been described in patents and patent applications such as the following: U.S. Pat. No. 4,178,993 by E. A. Richardson and R. F. Sherman describes a well treating process for initiating fluid production by injecting an aqueous solution containing nitrogen-gas-generating reactants having a concentration and rate of reaction correlated with the pressure and volume properties of the reservoir and the well conduits to react at a moderate rate within the well and/or the reservoir to generate enough gas to displace sufficient liquid from the well to reduce the hydrostatic pressure within the well to less than the fluid pressure within the reservoir.

U.S. Pat. No. 4,219,083 by E. A. Richardson and R. F. Sherman describes a process for cleaning well casing perforations by injecting an aqueous solution containing nitrogen-gas-generating reactants, an alkaline buffer providing a reaction-retarding pH and an acid-yielding reactant which subsequently overrides the buffer and lowers the pH in order to trigger a fast-rising pulse of heat and pressure which causes perforation-cleaning backsurge of fluid through the perforations.

U.S. Pat. No. 4,232,741 by E. A. Richardson, R. F. Sherman, D. C. Berkshire, J. Reisberg and J. H. Lybarger describes a process for temporarily plugging thief zones within a reservoir by injecting an aqueous solution containing nitrogen-gas-generating reactants, a foaming surfactant, an alkaline buffer and an acid-yielding reactant, arranged so that they initially delay the reaction and subsequently initiate a moderate rate of gas production, in order to form a foam which is, temporarily, substantially immobile within the reservoir formation.

U.S. Pat. No. 4,330,037 by E. A. Richardson and W. B. Fair, Jr. relates to injecting an aqueous solution which contains a concentration of gas-generating reactants and reaction rate-controlling materials which are correlated with the rate at which the solution is injected into the well and reservoir so that they both heat a selected zone to a selected temperature and, concurrently, increase the relative magnitude of the effective permeability to oil within a treated portion of an oil and water-containing reservoir.

Commonly assigned patent application Ser. No. 127,355 filed Mar. 5, 1980, by D. R. Davies and E. A. Richardson describes a process for conducting a production test by circulating a solution of nitrogen-gas-generating reactants within conduits within a well, with the solution buffered at a pH providing a promptly-initiated reaction having a relatively mild rate, and being inflowed through a conduit at a rate such that the gas which it generates serves as a lift gas for gas-lifting fluid from the reservoir through another conduit within the well.

The disclosures of the above patents and application are incorporated herein by reference.

Numerous uses of acidizing solutions comprising weak acids and/or their salts are described in patents such as the following: U.S. Pat. No. 2,301,875 describes employing an acidizing medium for oil wells comprising an aqueous buffer solution composed of a weak acid and a salt of a weak acid. U.S. Pat. No. 2,640,810 describes including formic acid or one of its salts in a hydrochloric acid solution to prevent the pH of the acid solution from rising above about 4. U.S. Pat. No. 3,142,335 describes including citric acid and salts of low molecular weight organic acids in hydrochloric acid as a sequestering agent for iron or the like. U.S. Pat. No. 3,441,085 describes injecting a weak acid having a concentration exceeding that needed to form a saturated salt solution and then injecting water to solubilize the acid salts.

SUMMARY OF THE INVENTION

The present invention relates to a well treating process. A self-reactive aqueous liquid solution is flowed into contact with materials in and around the borehole of a well. The inflowed solution consists essentially of an aqueous liquid solution which forms or contains a nitrogen gas-forming mixture of (a) at least one water-soluble compound which contains at least one nitrogen atom to which at least one hydrogen atom is attached and is capable of reacting within an aqueous medium to yield nitrogen gas and byproducts which are substantially inert to the components of the well and reservoir formation, (b) at least one oxidizing agent which is capable of reacting with said nitrogen-containing compound to form said gas and byproducts, and (c) at least one each of a weak acid and a weak acid salt. The weak acid and weak acid salt are present in a ratio which provides a solution pH at which the nitrogen generating reactants yield heat and nitrogen in response to a time-temperature exposure to which a solution is subjected while flowing from a surface location into the zone to be treated. The nitrogen generating reactants are present in a concentration in which they are capable of generating a selected amount of heat and nitrogen during their reaction in response to said time-temperature exposure. The mixture of weak acid and weak acid salt is present in a concentration providing an aqueous weak acid solution which is capable of effecting a weak acid acidization of materials encountered in and around the borehole of the well.

In a preferred embodiment, the nitrogen generating reactants consist of at least one each of water soluble compounds containing ammonium ions and nitrite ions.

DESCRIPTION OF THE INVENTION

The present invention is at least in part, premised on a discovery that in typical wells and reservoirs, the properties of (a) nitrogen generating reactants suitable for generating heat and nitrogen within the wells, (b) suitable acidizing concentrations of weak acids, and (c) suitable fluid inflow rates for the wells and reservoirs, provide a situation such that it is feasible to incorporate within a heat and nitrogen generating solution a buffer system which both maintains a suitable pH and provides a weak acid acidizing solution. This makes it feasible to acidize reservoirs with a hot acid where the combination of the climate, the earth temperature gradient, and the permeability of the reservoir, make it unfeasible to accomplish a heated fluid treatment by injecting fluids heated at surface locations.

Field Test

The well treated was recently completed in a reservoir in Michigan at a depth of about 6000 feet. The bottom hole temperature was 110° F. The reservoir is a dolomite formation which produced successfully in other parts of the field. The treated well had not produced more than a fraction of a barrel per day at a full draw down out pressure, even after repeated HCl-xylene treatments. In that field, attempts to heat the reservoir interval with fluids heated at the surface have not been significantly successful.

Two solutions were mixed in separate 50-barrel batches; one contained 9760 lbs. of sodium nitrite and 38 bbls. of water. The other contained 1630 gallons of 10.3 molar ammonium nitrate in water, 3360 lbs. of acetic acid, 1120 lbs. of sodium hydroxide and 10 gallons of corrosion inhibitor (Rodine 31A, an oil-soluble amino compound available from Halliburton).

The well was equipped with a 2⅞ths inch tubing which was terminated about 12 feet above the casing perforations at the reservoir interval. A string of 1-inch coil tubing was extended through the 2⅞ths inch tubing string to a depth of about 200 feet above the perforations. The first of the above solutions was pumped through the coil tubing and the second pumped through the annulus between it and the 2⅞ths inch tubing. The flow rate of both fluids was 0.25 bbls. per minute, making a total of 0.5 bbls. per minute of fluid flowing into the well.

The procedure allowed the solutions to be mixed at about 200 feet above the perforations. The amount of the acetic acid/sodium acetate buffer system utilized in this solution was about 8 times more concentrated than that contained in analogous heat and nitrogen-generating solutions used for other purposes. This mixture of weak acid and weak acid salt provided an acetic acid concentration of about 5% in the injected solution—for reacting with the dolomite formation after the other solutes had completed a generation of the heat and nitrogen. The solution was arranged to provide a temperature in excess of about 400° F. in response to the expected time-temperature exposure during pumping of 200 minutes. A post treatment shut-in time of one to three days was planned in order to allow the heat to dissipate and break any emulsion or acid sludge which might not be contacted directly by the hot solution.

After pulling the tubing string to move the packer, it was found that maximum temperature reading thermometers attached to the lower part of the 2⅞ths inch tubing string had measured temperatures of 350° F. 200 feet above the perforations, 510° F. about 100 feet above the perforations and 540° F. 10 feet above the perforations. The maximum temperature calculated from the concentrations of the reactants based on no heat loss in the system was 590° F.

The absence of nitrite ion in samples of fluid swabbed from the well indicated a complete spending of the nitrogen generating components of the solution. The average unspent acid as a fraction of the total acetate was 0.23, down from 0.5 in the freshly mixed treatment solution. For the 100-bbl. treatment a total of 384 gallons of acetic acid was used and one-half of this was neutralized by sodium hydroxide to form the buffered system ratio of acetic acid to sodium acetate. The system contained 192 gallons of acetic acid for reaction with the reservoir. Calculations indicate that about 104 gallons of the acid actually reacted with the rock. The rest was unreacted, as was expected from equilibrium conditions between the dolomite and acetic acid. The total amount of acid spent on the reservoir was about 12 gallons per foot of perforated interval, which is about one-half to one-fifth the usual recommended amount of acid for conventional well stimulation. In this situation, the amount of acid was deliberately chosen to be low in order to maximize the heating aspects of the test.

Based on the measurements made during and after the test, it was indicated that the heating operation was very successful in delivering up to 90% of the heat to the bottom of the hole. A substantial amount of hot acid was thus made available for reaction with the reservoir rock at the downhole producing interval.

Potentially valuable information on the interaction between permeability and heat conductivity of the reservoir was provided by measurements of the temperature and composition of the fluids in and produced from the borehole. The rapid cooling of the fluid after the well was shut down and the lack of a hot zone around the well (i.e., any zone hotter than 145° F.) indicates that significant cooling occurred in and around the well. Such a cooling effect is apt to involve factors such as the following: (1) the fluid injection may have formed cylindrical fractures outside the production zone, with hot fluid being lost into them, (2) a relatively small stringer such as one 3–6 inches thick may have very high permeability and take all of the hot fluid, to form a pancake of fluid which would cool very rapidly, with the volume of the stringer being so small that little production could be obtained, (3) small fractures may extend throughout the production zone so that the inflowing of hot fluid is confined to these fractures, so that the massive rocks between the fractures are heated only by conduction during the pumping in of the solution, and the massive blocks of rock are not heated completely during the pumping, so that the fracture walls and the fluid in the fractures will be relatively quickly cooled as soon as pumping ends. Such information may be particularly useful relative to future operations within the treated well and other wells in the area.

Suitable Treatments and Compositions

The reservoirs to which the present process is applicable include substantially any which may contain acid-reactive materials such as carbonates and/or deposits in or around the well of asphaltic or paraffinic emulsions and/or solids that tend to block permeability in the reservoir and/or sand or gravel packs in and around the borehole.

Weak acids suitable for us in the present process comprise those which, in aqueous solutions, are relatively reactive with acid reactive material. Examples of suitable acids include the water soluble fatty acids such as formic, acetic, propionic and the like, substituted water soluble organic acid such as chloroacetic acid, hydroxyacetic acid and the like, and various water soluble polycarboxylic acids such as citric acids and the like. Such acids can be used individually or in mixtures. Particularly preferred acids are acetic and formic acids.

Weak acid salts suitable for use in the process of the invention comprise water soluble salts of weak acids of the type described above. Examples of suitable salts include the ammonium or alkali metal salts of such acids. Such salts can be used individually or in mixtures and the salt of one weak acid can be used in conjunction with one or more different weak acids. Particularly preferred weak acid salts include sodium acetate and sodium formate.

Aqueous liquids suitable for use in the invention comprise water or substantially any relatively dilute aqueous solution of compounds compatible with weak acids, weak acid salts and the heat and nitrogen producing reactants such as ammonium and nitrite ion-containing compounds.

Suitable aqueous liquids may contain additives such as corrosion inhibitors, wetting agents, detergents, oil solvents and the like, which are commonly used in conjunction with acidizing solutions and are compatible with the heat and nitrogen generating reactants. However, it should be noted that where a relatively high concentration of reservoir acidizing acid is desired along with a relatively high heat generation, the concentrations of the dissolved materials may come close to saturating the aqueous solution and distilled or very fresh water may be desirable in order to avoid a salting out of the reactants.

The nitrogen-containing gas-forming reactants which are suitable for use in the present process comprise water-soluble inorganic ammonium ion-containing compounds which are relatively reactive at substantially ambient temperatures and are capable of reacting with an oxidizing agent within an aqueous medium to yield nitrogen gas and a substantially inert, relatively low-density, oil-immiscible aqueous saline solution. Examples of suitable ammonium ion-containing compounds include the ammonium salts of halogen acids, such as ammonium chloride; such salts of nitric, sulphuric, and nitrous acids and the like acids. Where available, ammonium nitrite can be utilized to provide both the ammonium ion and the nitrite ion, if the ambient temperatures are such that an undesirable extent of reaction does not occur while the compound is being dissolved in an aqueous liquid.

The oxidizing agents suitable for use in the present process comprise substantially any water soluble salts of nitrous acid which are compatible with and capable of reacting with the ammonium ion-containing compound within an aqueous medium to form nitrogen gas and a relatively low-density, oil-irmiscible, aqueous saline solution. The alkali metal or ammonium nitrities are particularly suitable.

As described in greater detail in the above mentioned U.S. Pat. No. 4,178,993, it is generally desirable to use substantially equimolar proportions of ammonium and nitrite ions, particularly when using concentrations in the order of from about 1 to 6 moles per liter of gas-generating reactants.

The rate at which the treating solution is injected into the well can be continuous or intermittant or can be varied substantially as desired as long as the rate of injection is correlated with the rate of the reaction within the treating solution, in the manner as described above. For example, a first portion of the treating solution can be injected and stopped in order to heat up a selected portion of the well or reservoir and/or the concentration of the reactants and/or rate at which the reactants react can be varied in order to generate more or less heat at a selected location within the well or reservoir.

In general, the determinations of the currently existing properties such as the temperature or volume or injectivity of the well and reservoir to be treated can be conducted or ascertained by logging or measuring procedures such as those currently available and/or by previous experience in the same or an adjacent well. The temperatures provided by the present heating procedure at a particular downhole location can be monitored during the treatment by means of conventional tools and, at least to some extent, such temperatures can be varied by varying the rate at which the nitrogen-gas-generating solution is injected.

In a particularly preferred procedure the pH of the nitrogen gas forming solution is arranged relative to the time-temperature exposure of fluid flowed into the zone to be treated (due to the well temperature, etc.) so that the rate at which that solution is flowed into the well and the reactivity of the solution are correlated to ensure that at least substantially all of the nitrogen gas developing reaction is completed before the solution is displaced into the reservoir. In various situations, particularly where both a relatively high temperature and relatively high concentration of weak acids are desirable it may be advantageous to spot a relatively small slug of relatively concentrated nitrogen generating solution at or near the interval to be treated to establish a hot spot within the borehole and thus ensure that following portions of weak acid containing nitrogen generating solution will have a rate of reaction which becomes rapidly accelerated in order to ensure the completion of the reaction within the borehole.

Where paraffinic or asphaltinic oils and/or emulsions containing such oils are involved, it ray be desirable to precede and/or follow the injection of the present weak acid-containing nitrogen generating solution by an injection of a liquid solvent for such oils. Such solvents can suitably be substantially any organic liquid which is apt to remain at least substantially liquid at the conditions generated within the borehole during the hot acid treatment such as the higher boiling hydrocarbon fraction and/or aliphatic or aromatic hydrocarbon diesel oil, toluene, pentane, xylene and the like are particularly preferred solvents.

What is claimed is:
1. A well treating process comprising:
   flowing a self-reactive aqueous liquid solution into contact with materials in and around a well;
   said solution consisting essentially of one which forms or contains a nitrogen gas generating mixture of (a) at least one water soluble compound which contains at least one nitrogen atom to which at least one hydrogen atom is attached and is capable of reacting within an aqueous medium to yield nitrogen gas and byproducts which are substantially inert to the components of the well and reservoir formation, (b) at least one oxidizing agent which is capable of reacting with said nitrogen containing compound to form said gas and byproducts and (c) at least one each of a water soluble weak acid and weak acid salt which are compatible with the nitrogen gas forming reactant;
   said weak acid and weak acid salt being present in a ratio providing an acidic solution pH at which said nitrogen gas generating reactants react in response to the time-temperature exposure to which a solution is subjected while flowing from a surface location to the zone to be treated;
   said nitrogen gas generating reactants being present in a concentration in which they are capable of generating a selected amount of heat and nitrogen during a reaction in response to said time-temperature exposure; and said mixture of weak acid and weak acid salt being present in a concentration providing an aqueous solution of weak acid which is capable of both maintaining said solution pH while the nitrogen gas generating reactants are reacting and, to a significant extent, effecting a weak acid reservoir acidization of materials contacted in and around the borehole of a well by providing a weak acid concentration in the injected solution of at least about five percent.

2. A well treating process comprising:

flowing a self-reactive aqueous liquid solution into contact with materials in or around the borehole of a well;

said solution consisting essentially of a heat and nitrogen generation aqueous solution of at least one each of a water soluble ammonium ion-containing compound and nitrite ion-containing compound and at least one each of a weak acid and a weak acid salt;

said weak acid and weak acid salt being present in a ratio providing an acidic solution pH at which said ammonium and nitrite ion-containing compound react to yield heat and nitrogen in response to the time-temperature exposure to which a solution is subjected while flowing from a surface location to the zone to be treated;

said ammonium and nitrite ion-containing compounds being present in a concentration in which they are capable of generating a selected amount of heat and nitrogen during a reaction in response to said time-temperature exposure; and said mixture of weak acid and weak acid salt being present in a concentration providing an aqueous solution of weak acid which is capable of both maintaining said solution pH while the nitrogen gas generating reactants are reacting and, to a significant extent, effecting a weak acid reservoir acidization of materials contacted in or around the borehole of the well by providing a weak acid concentration in the injected solution of at least about five percent.

3. The process of claim 2 in which said solution inflow rate and pH are arranged so that substantially all of the heat and nitrogen generating reaction is completed before the solution flows through the borehole and into the reservoir.

4. The process of claim 2 in which said ammonium ion and nitrite ion-containing compounds consist of ammonium nitrate and sodium nitrite.

5. The process of claim 2 in which the weak acid and weak acid salt consist of acetic acid and sodium acetate.

6. The process of claim 2 in which the weak acid and weak acid salt consist of formic acid and sodium formate.

7. The process of claim 2 in which the weak acid and weak acid salt consist of formic acid and sodium acetate.

* * * * *